Feb. 23, 1926.
W. H. SERGENT
1,574,121
FORMING MECHANISM
Original Filed Jan. 9, 1922   2 Sheets-Sheet 1
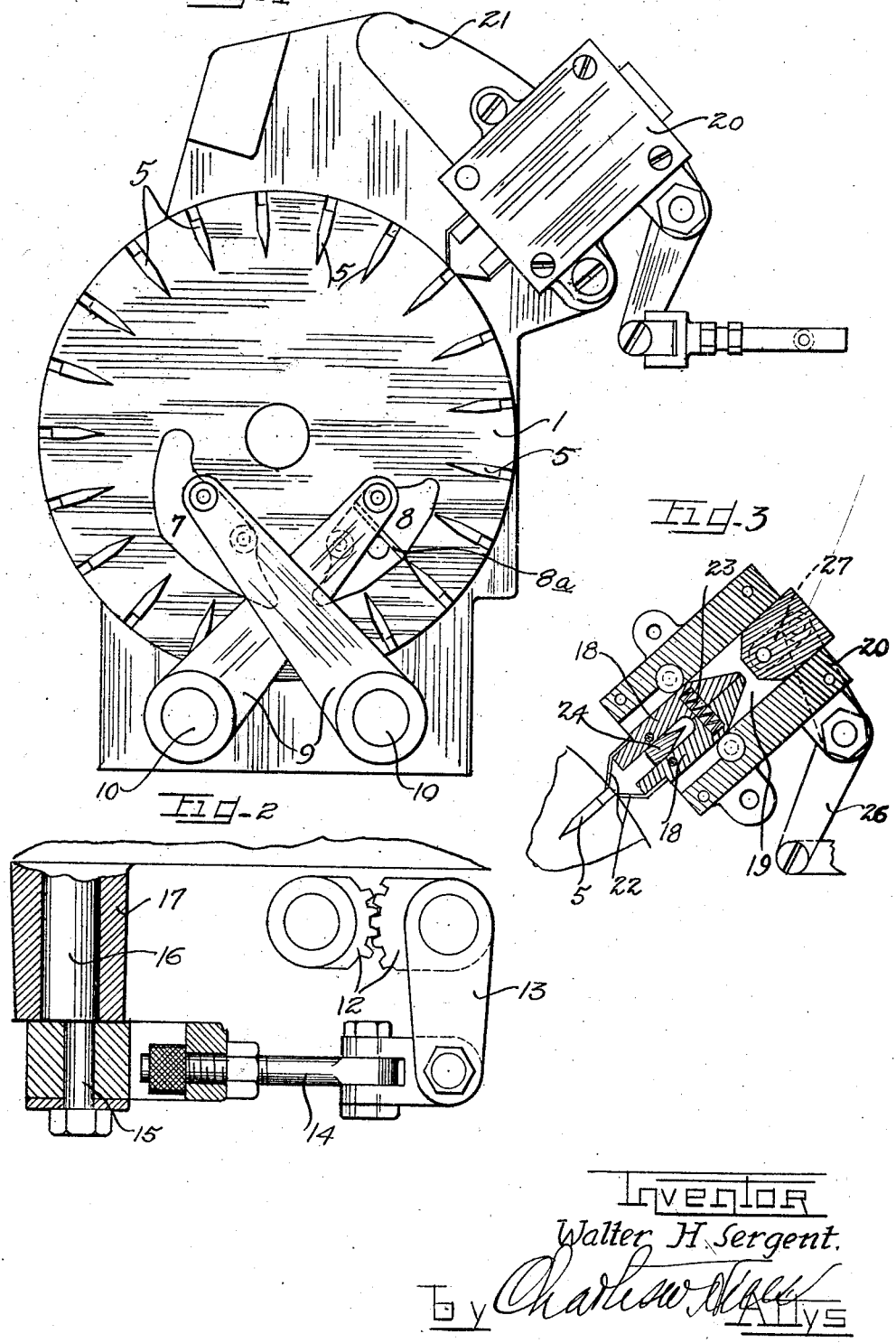

Feb. 23, 1926.

W. H. SERGENT 1,574,121

FORMING MECHANISM

Original Filed Jan. 9, 1922    2 Sheets-Sheet 2

Inventor
Walter H. Sergent.
By
Attys

Patented Feb. 23, 1926.

1,574,121

UNITED STATES PATENT OFFICE.

WALTER H. SERGENT, OF MIDDLETOWN, NEW YORK, ASSIGNOR TO IDEAL WRAPPING MACHINE COMPANY, A CORPORATION OF NEW YORK.

FORMING MECHANISM.

Original application filed January 9, 1922, Serial No. 527,828. Divided and this application filed December 28, 1923. Serial No. 683,139.

*To all whom it may concern:*

Be it known that I, WALTER H. SERGENT, a citizen of the United States, and a resident of the city of Middletown, in the county of Orange and State of New York, have invented certain new and useful Improvements in a Forming Mechanism; and I do hereby declare that the following is a full, clear, and exact description of the same, reference being had to the accompanying drawings, and to the numerals of reference marked thereon, which form a part of this specification.

This invention relates to a forming mechanism for a caramel or candy wrapping machine in which the candy dough is fed to a rotary forming and cutter box from which the formed pieces of candy are projected to a wrapping wheel. This application is a division of my pending application for "caramel wrapping machine", Serial No. 527,828, filed January 9th, 1922.

It is an object of this invention to provide improved mechanism for forming and cutting the cubes or pieces of candy for feeding the same into a wrapping wheel.

The invention comprises the novel mechanisms and combinations hereinafter described and more particularly pointed out and defined in the appended claims. In the accompanying drawings which illustrate the preferred form of this invention, and in which similar reference numerals refer to similar features in the different views.

On the drawings:

Figure 1 is a top plan view of the forming mechanism with parts omitted.

Figure 2 is a bottom plan view of said operating mechanism therefor with parts shown in section.

Figure 3 is a sectional view through a wiper that is used in connection with the forming box.

As shown on the drawings:

Figure 4:
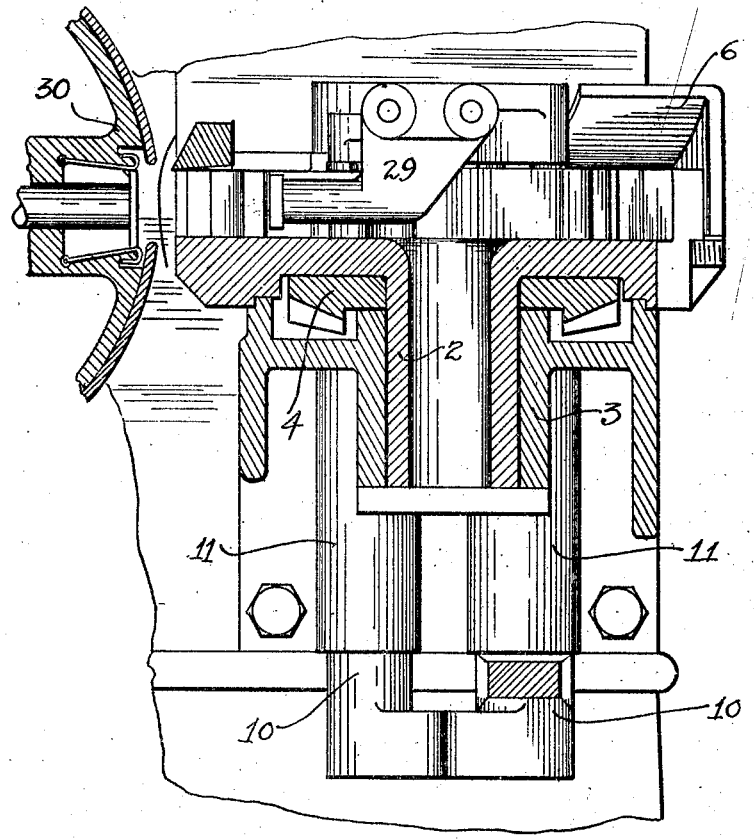
Figure 4 is a sectional view through the forming box, and the supporting framework therefor with a section of the wrapping wheel adjacent thereto.

Referring to the drawings, reference numeral 1 refers to an intermittently rotatable disk having a downwardly extending hub 2, rotatably mounted in a socket formed in a supporting bracket 3, which constitutes a part of the framework of the machine. The lower surface of the disk which is provided with a beveled gear 4, by means of which intermittent rotary movement may be imparted to the disk. The upper surface of the disk 3 is provided with radially extending blades 5 near the outer periphery. In the present instance these blades are secured in grooves in the upper surface of the disk and are tapered toward their inner end to provide a cutting edge. These blades are spaced a distance equal to the length of the cube of candy desired and they are also spaced a short distance from the outer periphery of the disk to provide a circumferential marginal space for a guard 6 which encircles the disk 1 and forms in connection therewith, a mould or forming box that prevents the candy dough from escaping, which is fed into the forming box.

As the plastic dough is fed upon the cutting disk 1, and passes under the guard 6, or in other words as it is fed into the forming box, it is first acted upon by a presser foot 7, which presses or partially forces the plastic dough between the blades 5, and as the disk is rotated, the dough is acted upon by a second presser foot 8 which completely presses the plastic dough into the moulds formed by the blades 5, and guard 6, and at the same time shears the formed cubes of dough by pressing against the cutting edges of the blades 5, as shown in Figure 1. The presser foot 8 is so constructed that it will only come in direct contact with a single blade at a time and to preserve the edges of the cutting blades, a fibrous insert $8^a$ or other suitable substance, is fixed in a specially provided groove in the presser foot so that the blades will strike the fibre. Figure 1 shows the position of the presser feet at the limits of their operative pressing strokes and it will be noted that the presser foot 7 is spaced some distance from the cutting edges of the blades while the presser foot 8 contacts a single blade at the fibre insert $8^a$. The presser feet glide over the upper surface of the disk 1 and are connected for simultaneous operation. One method of accomplishing this function consists in using a pair of cross levers 9 and rigidly connecting the outer end of each to its respective presser foot (see Fig. 1) and rigidly connecting the inner end of each lever to a separate vertical operating rod or shaft 10. The shafts 10 are journaled in suitable tubular bearings 11 (Fig. 4) secured side by side to the rear wall of the casing of the machine; the lower end of each shaft projecting beyond its bearing and being provided with a gear segment 12 (Fig. 2). The two gear segments intermesh in the form of a toggle so that the two shafts 10 are constrained to oscillate simultaneously. For the purpose of oscillating the shafts 10, a crank 13 is rigidly secured to one gear segment at one end and connected by an adjustable link mechanism 14 at its other end to a wrist pin 15 eccentrically formed upon a driving shaft 16 journaled in a bearing boss 17 forming a part of the rear wall or casing of the machine. The shaft 16 is continuously operated from the main driving shaft of the machine.

Figure 5:
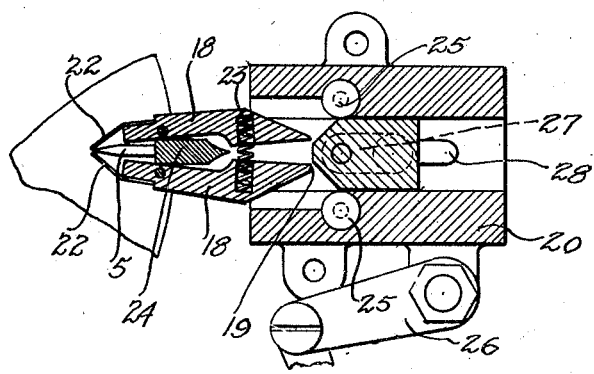
Figure 5 is a sectional view through the wiper similar to Figure 3 with the parts, however, in different position.

In order to scrape and cleanse the cutting blades, a specially constructed wiping mechanism has been provided, as shown in Figures 1, 3 and 5. The mechanism consists of a pair of jaw members 18 pivoted intermediate their ends upon a reciprocating block or plunger 19 slidably mounted in a guideway formed in a support 20 secured to the bracket 21, adjacent the forming box. The front part of the guideway is enlarged to allow the rear ends of the jaw members to expand so that the wiping elements 22 secured to the forward ends thereof may contract and embrace the cutting blades 5. For the purpose of thuswise expanding the jaw members 18, a spring 23 is suitably anchored between the rear ends of the jaw members by providing suitable anchoring holes or sockets in the inner face thereof. In order to properly space the front ends of the jaw members, a lug 24 is preferably provided upon the sliding plunger 19 between the said jaw members which are cut away or rabbeted upon their forward inner sides. A pair of rollers 25 or the like, are preferably positioned at the inner corner of the enlarged guideway and the rear ends of the jaw members are beveled so that upon the inward movement of the reciprocating block or plunger 19, the beveled ends will readily ride up the rollers into the restricted guideway, thus opening the jaw members against the tension of the spring 23. The slidable block or plunger 19 is periodically reciprocated by means of a bell crank lever 26 connected by a link 27 (shown in dotted lines in Figures 3 and 5) to the sliding block 19 which is provided with a wrist pin projecting through a slot 28 in the lower wall of the guideway. It is evident that as the plunger 19 is reciprocated outwardly the wiping elements will pass on each side of the blade, and when the outward limit of movement has been reached and when the lug 24 strikes the rear end of the blades, the rear ends of the jaw members will advance into the enlarged guideway which will allow them to expand and press the wipers 22 together so that upon the inward movement of the block 19, they will scrape the blades, and when the inward movement brings the wipers to the ends of the blades 5, the beveled ends of the jaws 18 will ride up the rollers 25 into the restricted guideway to expand the wipers for another operation. This operation will be repeated as each blade 5 comes to rest in front of the wiping mechanism. As the cutting disk rotates only the distance between two blades at each operation thereof, it is only necessary to locate the wiping mechanism in front of a blade when at rest, as each succeeding blade will come to rest at the same point. The crank 26 is connected by suitable means to the operating mechanism of the machine.

The formed and sheared cubes of candy are ejected from the forming box by an ejector 29 (Fig. 4) into a pocket of a wrapping wheel 30, as is well-known in the art; the guard 6 being suitably cut away for such a purpose. As the operation of the foregoing described mechanism is well understood in the art, further description thereof is deemed unnecessary.

I am aware that numerous details of construction may be varied through a wide range without departing from the principles of this invention, and I therefore do not purpose limiting the patent granted otherwise than necessitated by the prior art.

I claim as my invention:

1. In a caramel wrapping machine, rotary forming box, means for rotating the same, a pair of inter-geared vertical rods extending above said forming box, levers secured upon the upper ends of said rods, presser feet secured to said levers and extending into said forming box and means for oscillating said rods.

2. In a caramel wrapping machine, a cutter disk, and a presser foot cooperating therewith, provided with a fiber insert, for the purpose described.

3. In a caramel wrapping machine, a rotary disk having radially extending blades thereon, a presser foot adapted for forcing candy dough between said blades and shearing the same, said presser foot having a fiber insert adapted for contacting engagement with the cutting blades.

4. In a caramel wrapping machine the combination with a rotary forming box having radially extending blades, of means for scraping and cleansing said blades comprising a reciprocating element having wiping elements adapted for engaging opposite sides of said blades.

5. In a caramel wrapping machine, the combination with a rotary disk having radially extending blades, of means for cleansing said blades comprising a housing having a guideway, a block slidable in said guideway, a pair of jaw members pivoted intermediate their ends in said block, means for reciprocating said block and means for contracting and expanding said jaw members during the reciprocation of said block.

6. In a caramel wrapping machine, a rotary forming box, a pair of intergeared vertical rods extending above said box, arms upon the upper ends of said rods, presser feet in said forming box pivoted to said arms, and means for oscillating one of said rods.

In testimony whereof I have hereunto subscribed my name.

WALTER H. SERGENT.